July 28, 1931.  B. W. KING  1,816,189
SCALE
Filed June 13, 1929  4 Sheets-Sheet 3
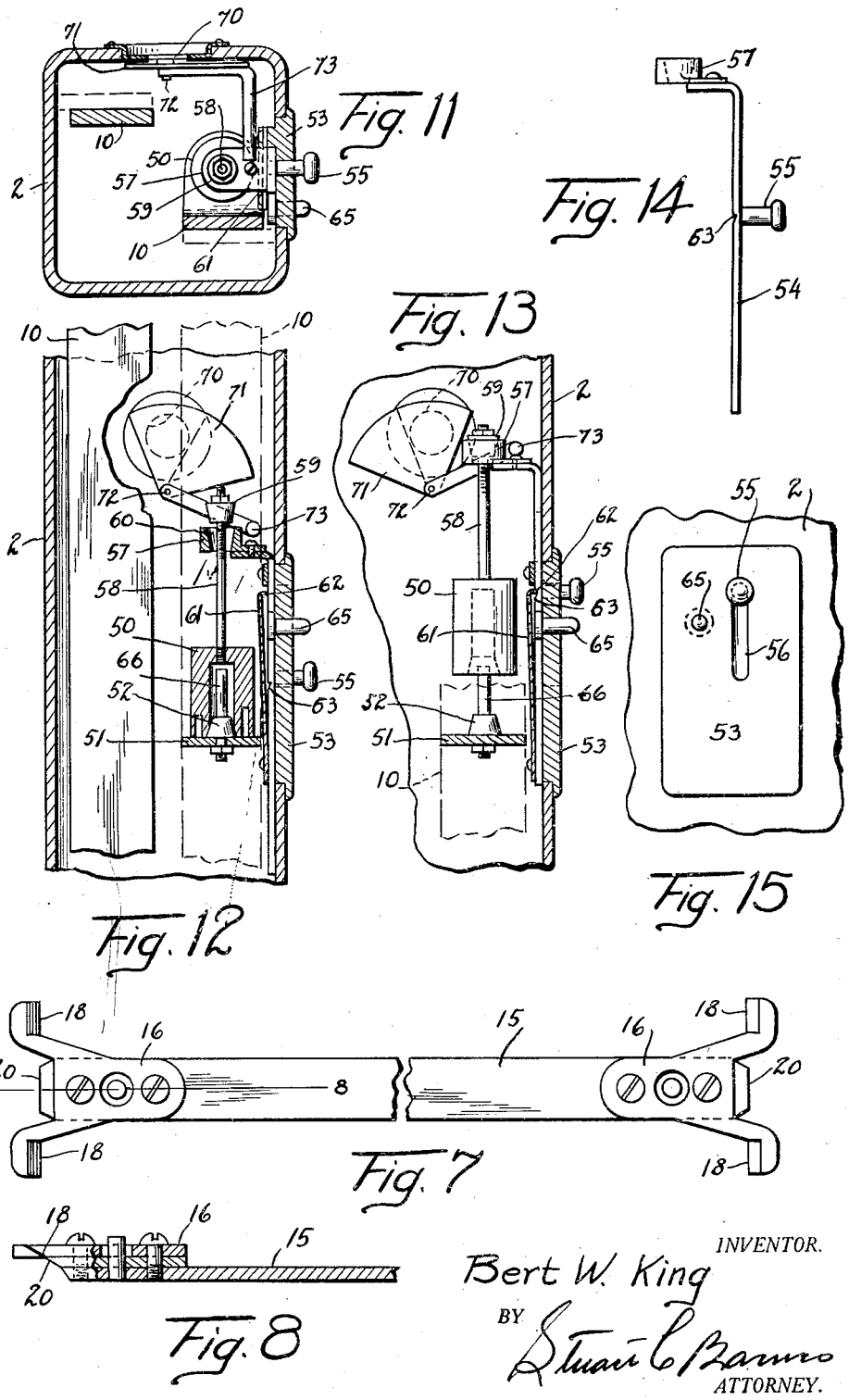
INVENTOR.
Bert W. King
BY
Stuart C. Barnes
ATTORNEY.

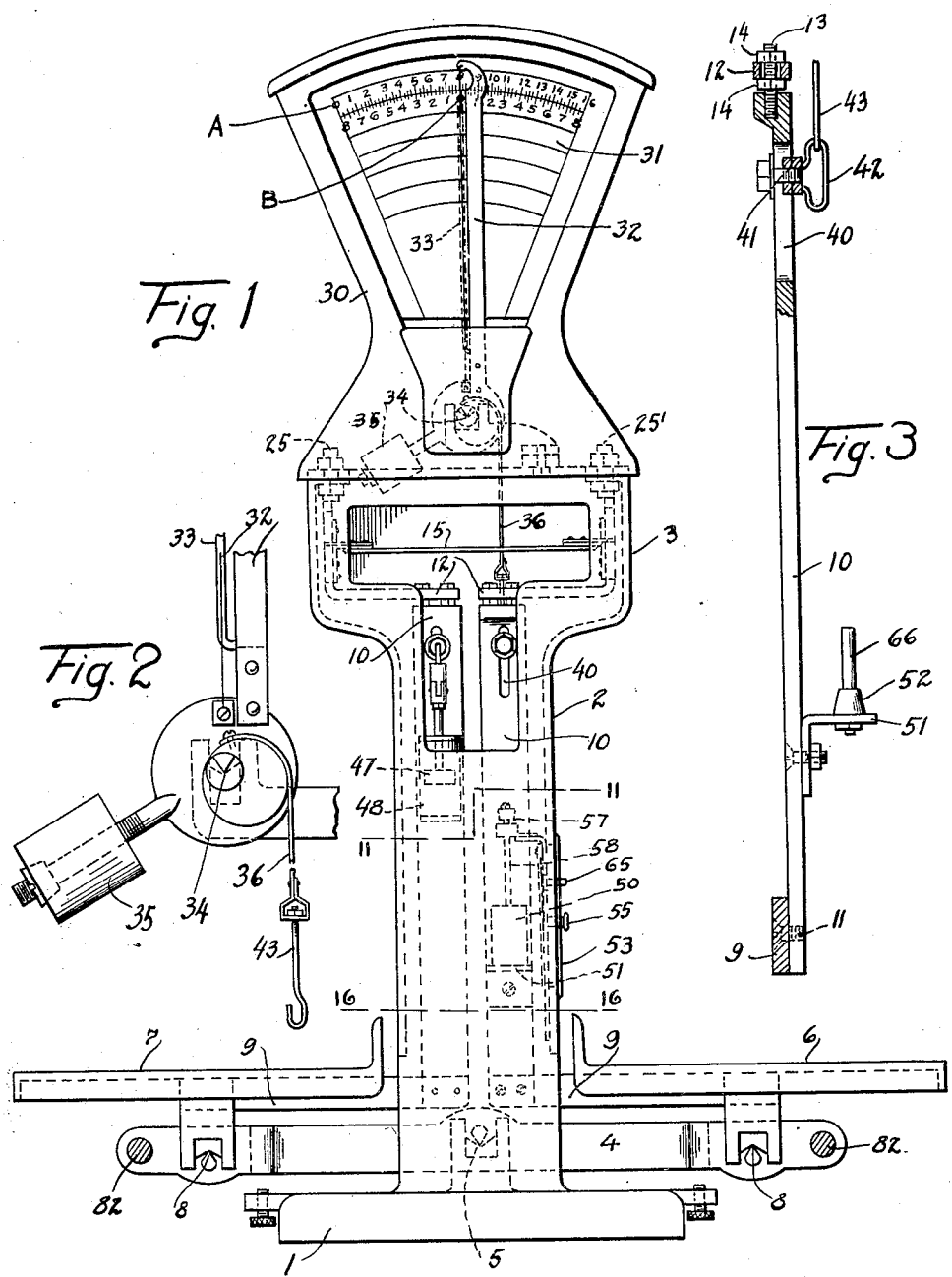

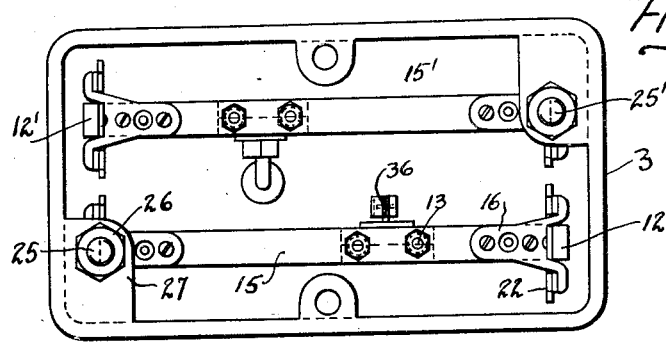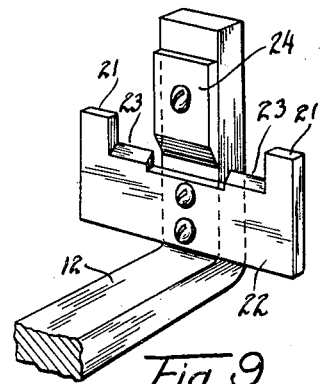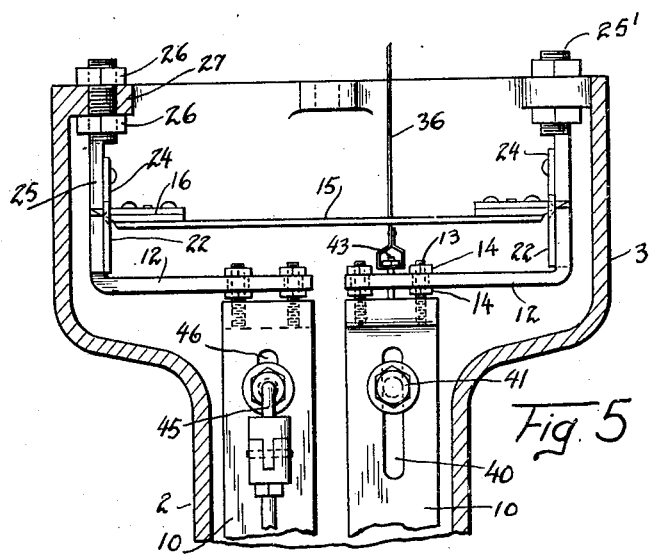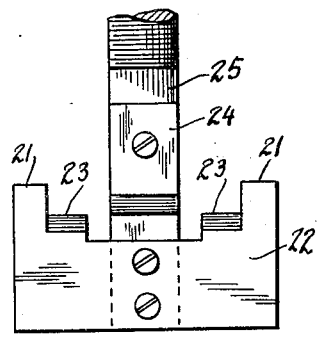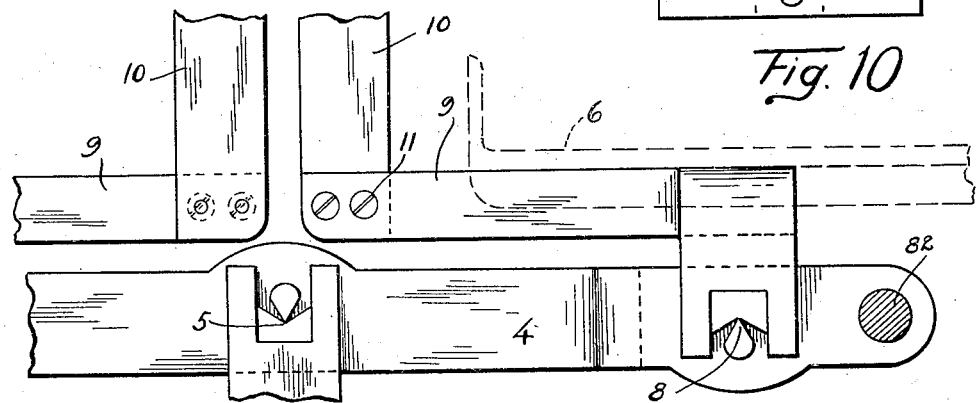

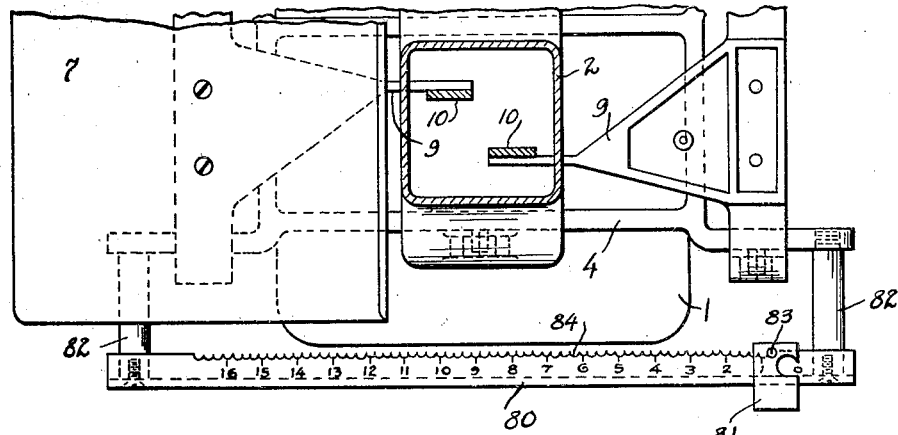
Fig. 16
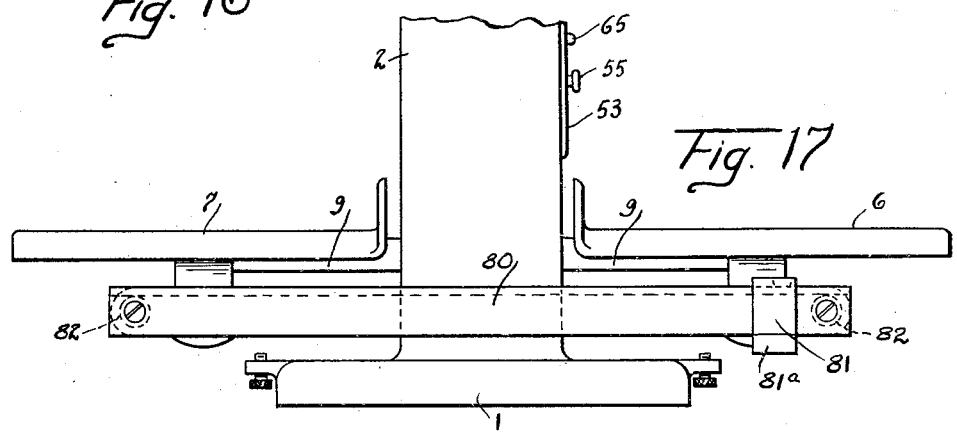
Fig. 17
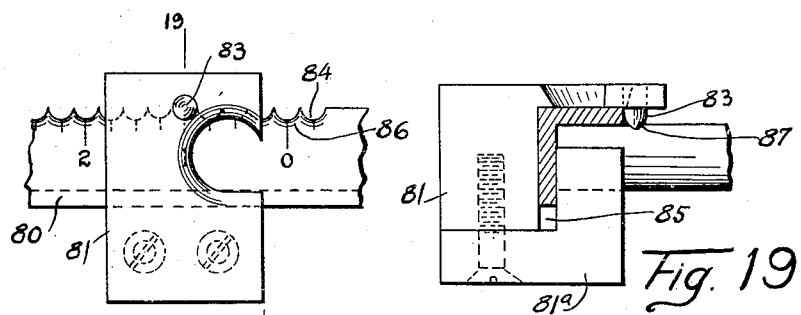
Fig. 18
Fig. 19
INVENTOR.
Bert W. King
BY
ATTORNEY.

Patented July 28, 1931

1,816,189

UNITED STATES PATENT OFFICE

BERT W. KING, OF DETROIT, MICHIGAN, ASSIGNOR TO BARNES SCALE COMPANY, OF DETROIT, MICHIGAN, A CORPORATION OF MICHIGAN

SCALE

Application filed June 13, 1929. Serial No. 370,507.

This invention relates to a scale, and has to do particularly with a scale construction which is useful in connection with an indicator of fan shape, wherein there is an indicating chart of fan shape, generally, with a pivoted pointer or the like which traverses this chart. The invention, however, is not of necessity limited to use with a fan-shaped indicator.

The invention aims to provide a scale of great utility in that it is readily adaptable for use as a computing scale: that is, an article to be weighed may be placed upon a scale platform and the weight of the article, its cost, selling price, or its value, or the like is indicated by the position of the pointer upon the chart. The chart is provided with the usual indicator for this purpose. The scale may also be used as an even balance scale, or what is generally termed by those skilled in the art, as an over and under scale. In this regard a very simple construction is provided for altering the nature of the scale. A simple, easily operable mechanism is arranged so that an additional weight may or may not be associated with the lever system as desired in order to determine the nature of the scale, and in conjunction with this there is preferably an indicator which advises as to the set of the scale, and the manner in which it is to operate.

The invention furthermore aims to provide a scale with a novel arrangement of a mechanism embodying a construction associated with the check arms or links. These check arms or links, of necessity, need adjustment at the time the scale is assembled in the factory, and oftimes at the time when the scale is originally installed for use, or at a later date after a period of use. The construction affords a very simple and easy adjustment for these check arms, especially as regards a length of the check arms and their angular position for accurate alignment of knife edge bearings.

Fig. 1 is a front elevational view of a scale constructed in accordance with the invention, illustrating some of the interior parts in dotted lines, and with a removable cover plate removed showing how access may be had to certain of the scale mechanism, and also with the weight beam removed.

Fig. 2 is an enlarged detail of the pendulum and associated parts of the scale.

Fig. 3 is a detail view illustrating one of the vertical members associated with a platform of the scale for transmitting the load.

Fig. 4 is a view looking down into the post of the scale showing the check link arrangement.

Fig. 5 is a sectional view taken through the post housing, and showing the check link arrangement and associated load communicating members.

Fig. 6 is an enlarged view showing the load lever and platform arrangement.

Fig. 7 is a plan view of a check link.

Fig. 8 is a sectional view thereof taken on line 8—8 of Fig. 7.

Fig. 9 is a perspective view of an arm member to which a check link is connected.

Fig. 10 is a view illustrating a stationary pivotal connecting member for a check link.

Fig. 11 is a sectional view taken through the scale post, substantially on line 11—11 of Fig. 1.

Fig. 12 is a vertical section taken through the scale post showing the extra weight employed for the purpose of changing the nature of the scale.

Fig. 13 is a similar view showing the weight in a different position.

Fig. 14 is a view of the weight shifting member.

Fig. 15 is a side elevational view of the outside of the scale post showing the shifting device for the extra weight.

Fig. 16 is a view taken substantially on line 16—16 of Fig. 1 in illustration of certain structural features, and showing the weight beam.

Fig. 17 is a view of the lower portion of the scale similar to Fig. 1, showing the beam in place.

Fig. 18 is a detail of an adjustable weight carried on the beam.

Fig. 19 is a section taken on line 19—19 of Fig. 18.

The scale includes a base 1 which supports a vertical hollow post 2, preferably enlarged at its upper end to form a housing 3. The main load lever, in the nature of a balance beam, is shown at 4; it is of double or frame construction, as illustrated in Fig. 16, and the same is pivoted on a knife edge bearing, preferably with an agate socket therefor, as illustrated at 5. There are platforms 6 and 7 supported by opposite ends of the lever 4, pivotally as by means of knife edges preferably, agate bearings as at 8. Each platform is supported by a frame-like supporting construction 9 (Fig. 16), and connected to each supporting member 9 is a vertically extending rod member 10. The members 9 and 10 are rigidly connected, as shown at 11 (Fig. 6), so as to have no pivotal movement between them. The members 10 extend upwardly through the post (Fig. 1) and into the head 3, wherein a check link construction is provided for maintaining the platforms in horizontal position. The check link arrangement is best shown in Figs. 4 and 5, and the check links for the respective vertical pull rods 10 are identical, except that they are reversed as to position. Each member 10 has an angularly-shaped arm 12 secured to its upper end. The member 12 is secured to its respective arm 10 so that it can be adjusted relative thereto vertically, horizontally, angularly in a horizontal plane and angularly in a vertical plane. Such a construction may take the form illustrated in the drawings, namely, a pair of screw-threaded studs 13 affixed to the member 10, with the member 12 having openings for fitting over the studs, with the member 12 secured in place thereon by the nuts 14 positioned on opposite sides of the member 12. It will be apparent that the member 12 may be vertically adjusted, by raising the relative positions of the opposed nuts 14; the member 12 may also be adjusted angularly in a vertical plane by raising one pair of the nuts relative to the other pair; also, it will be noted that the openings through the member 12 are somewhat larger in diameter than the studs 13, and by loosening the nuts 14, the member 12 may be adjusted laterally as regards the pull rod 10, or angularly within certain limits in a horizontal plane. This last adjustment is very important in order to line up knife edges associated with the check link.

The check link for this member 12 is shown at 15. This link is pivotally connected to the member 12, preferably by opposed knife edge bearings. By reference to Fig. 7, it will be noted that the link 15 has a member 16 secured thereto, provided with knife edges 18, while underneath the member 16 is a member 19 having a knife edge 20 extending in reverse direction from the knife edges 18. The knife edges 18 engage projections 21 on a cross member 22, carried by the member 12 (Fig. 9), while the knife edge 20 abuts directly against the member 12 with the link 15 resting upon knife edge bearings 23. The same is held from jumping off the knife edge bearings and out of place by an abutment 24. This affords a double knife edge bearing, well known to those versed in the art.

The opposite end of the check link 15 is similarly provided with knife edges, to which identical reference characters have been applied. This end of the link if pivoted in a fixed manner, to post 25, secured to the housing by means of the same being screw-threaded, and with nuts 26 on opposite sides of an ear 27 of the housing. The post 25 has secured thereto, a device providing bearing members for the knife edges the same as provided on the piece 12. This is shown in Fig. 10, wherein the same reference characters are applied to these devices as the reference characters of the devices on the member 12, as shown in Fig. 9.

As will be noted by reference to Fig. 4, the members 10 are in disalignment with each other as regards the front and back of the post, and there is a check link and double knife edge construction for the other pull rod member 10. This construction is identical with that just described, and in order to save duplication of description, some of the same reference characters are applied to similar parts, except that the characters are identified by a prime.

These check links 15 and 15' serve to maintain the platforms horizontally. Insofar as described, a structure is provided wherein weights on the two platforms may be balanced. The check links have a length equal to the distance between the pivot 5 and the platform pivots 8 and each forms with its respective part of the member 4, parallel levers, so that the check links 15 and 15' hold their respective platforms horizontally.

The indicator housing is shown at 30, and is provided with a chart 31. The pointer is preferably double, having a point 32 and point 33 disposed on opposite sides of the chart so that the scale can be read from either side thereof. This indicator is mounted for rocking upon a bearing, preferably a knife edge bearing 34. The conventional pendulum 35 is associated with the indicator, and this construction is connected by the means of a conventional ribbon 36 to one of the pull rods 10. To accomplish this, the lever is provided with an elongated opening 40, in which is adjustably secured a stud or bolt 41, carrying loop 42 to which a hook 43 on the ribbon is connected (Fig. 3).

For the purpose of controlling the action of the scale, it is preferable to provide a dash pot arrangement. In the present instance, this is accomplished by means of a rod 45 connected to one of the pull rods 10, preferably adjustable by means of an elongated opening 46 in that rod. The rod 45 carries a plunger, or piston, 47 working in the cylinder 48.

It will be observed that this scale construction embodies an even balance construction. By this is meant that a known weight can be placed upon one platform, and an unknown weight on the other. The unknown weight may be changed to balance with the known weight. It will be noted that the chart has two sets of indicating numerals, or indicia, thereon. One set having its zero point at A on one side of the chart, and the other set having its zero point at B in the center of the chart. The scale is preferably normally balanced, so that when at rest, the pointer is at position A. Accordingly, any article to be weighed within the limits of the scale may be placed on the platform 6 and its weight indicated by the numerals having their zero position at A. When the scale is thus used, a suitable computing indicia (not shown) can be placed upon the chart for computing various matters, such as the value, amount of the cost, and selling price, or the like, of the article on the scale.

An additional weight construction is provided for balancing the scale in order to bring the pointer at zero position B, so that the scale may be used as an even balanced scale. This construction comprises a weight 50 (Fig. 13), adapted to seat upon a shelf, or platform, 51 (Fig. 3), carried by one of the rods 10. In Fig. 12 the weight is shown upon the shelf. The weight is provided with a central hollow portion which fits around a conical-shaped piece 52 which centers the weight. A suitable plate 53 is attachable to the vertical post, in an aperture provided therefor, and this plate carries a reciprocable member 54, provided with a finger piece 55 projecting through an elongated slot 56 in the plate. A ring-like member 57 is carried by the member 54, through which rod 58 for the weight 50 extends. The upper end of the rod 58 has a conical centering member 59, and the ring-like member has a conical-shaped opening 60 therein. Also carried by the plate 53, is a spring element 61 having a projection 62 adapted to fit in the notch 53 in the member 54. The spring element 62 may be moved by a plunger 65, which projects through a suitable opening in the plate member. Rising from the conical member 52 on the shelf 51, is a post or stud 66, which at all times, is at least partially within the hollow portion of the weight 50, for purposes which will presently appear.

Assuming that the scale is adjusted so that the pointer normally takes its rest position at A, and that it is desired to bring the pointer at rest at B position, in order that the scale may be utilized as an even balance scale. The weight 50 at this time, is in the position as shown in Fig. 13, namely, it is raised off of the platform 51. In this position, the spring element has its end 62 in recess 63, and the weight is held suspended from the ring member 57. An operator may merely depress the plunger 65, which flexes the spring and removes its end out of the notch 63. Thus the weight 50 drops on the platform 51, and it is calculated to bring the pointer at rest at position B. The scale may now be used as an even balance scale. To free the mechanism from this position, the operator lifts the finger piece 55, thus raising the weight 50 and allowing the spring end 62 to snap back into recess 63, thus holding the weight suspended.

It is desirable that an indication be made, especially for advising the customer as to how the scale is operated. For this purpose, a suitable opening 70 in the post of the scale is provided (Fig. 11), which may be closed by a transparent member if desirable, and behind which there is a target member 71 pivotally mounted as at 72. This target member carries an arm 73 which lies over the top of member 54. Accordingly, when the member 54 is raised, the target 71 is rocked to the position shown in Fig. 13, and when the weight is lowered, the indicating member drops back to the position shown in Fig. 12. Suitable indicia may be provided on the member 71 so the same is visible through the aperture, thus to indicate whether the scale is set for computing purposes or for even balance weighing.

The scale contemplated, is one which normally does not have extraordinarily great capacity, although it may have any capacity desired. Where the scale does not have normally great capacity, it is desirable to provide additional capacity. This is afforded by the provision of a beam 80 (Fig. 16), on which is an adjustable weight 81. This beam may be held to the main lever by means of suitable supports 82. The manner in which the adjustable weight is used in conjunction with the indicating chart is well known to those skilled in the art. This weight, however, and the beam, is arranged so that accidental displacement of the weight is positively prevented. In other words, once the weight is set in given position, it cannot be moved therefrom without manual manipulation. As shown in Fig. 19, the beam is L-shaped in cross section, and the weight has a depending pin 83 adapted to engage notches 84 in the beam. The weight is preferably of two-piece construction, embodying a lower part 81a, arranged with a clearance space 85 with respect to the beam. The notches are so cut as to provide for cam-like faces 86 with which the lower curved edges 87 of the pin 83 is adapted to engage.

In order to adjust the weight along the beam, it first must be raised vertically to disengage the pin from a notch, and when its position is ascertained, it is dropped. When pin 83 slides into a notch, there is a camming action by the contacting surfaces of the lower end of the pin and the surfaces 86, for accurately positioning the weight.

It is not new broadly, to provide a weight beam, wherein the weight can only be moved along the beam after a pin, or the like, thereon has been removed from a recess on the beam. However, in the prior art, the beam was so positioned that its notches were uppermost. In accordance with the present invention, a horizontally disposed beam is provided so that it can be easily read inasmuch as it is disposed near the base of the scale, and the beam has notches along one edge. The weight is arranged, however, so that vertical movement disengages the same from these notches, disposed on a longitudinal edge of the beam. This is a novel construction and it makes feasible the disposition of a beam in the low position, so that the numbers thereon can be easily read, and yet provides a weight which can be disengaged from movement only by relative vertical movement as regards the beam.

Turning back now to the adjustments which can be made in the members 12 on the pull rods 10, it will be noted that each member 12 must be accurately adjusted with respect to its respective check link, in order that the knife edge bearings 18 and 20 may come flush against the abutments in the member 12. Heretofore, it has been the practice to adjust the fixed bearing end of the check links, such as the end pivoted on post 25. This has been very objectionable, because of the necessity of taking apart much of the construction, and because of difficulty of access thereto. In the present invention the fixed pivoted ends of the links 15 and 15' may be allowed to remain intact, and the member 12 adjusted instead. Accordingly, the members 12 may be angularly adjusted as regards the member 10, to accurately line up the knife edge bearings. In addition to this, the members 12 may be adjusted bodily vertically, or angularly in a vertical plane, or bodily in a horizontal plane. This is very easily accomplished, because, as will be noticed by reference to Fig. 1, the members 12 and their holding nuts are easily accessible through the opening in the post and housing of the scale. A suitable closure member (not shown) is provided for this opening, and it preferably is readily movable so that access may be had to these adjustable parts.

Claims:

1. In a scale, a vertically positioned hollow post, lever means near the bottom of the post, a platform associated with the lever means, a pull rod connected to the platform and extending upwardly through the vertical post, a check link near the upper portion of the post, stationary fulcrum means for one end thereof, means connected to the pull rod providing a fulcrum for the other end of the check link, and means adjustably connecting the last mentioned means to said pull rod.

2. In a scale, a vertically positioned hollow post, lever means near the bottom of the post, a platform associated with the lever means, a pull rod connected to the platform and extending upwardly through the vertical post, a check link near the upper portion of the post, stationary fulcrum means for one end thereof, means connected to the pull rod providing a fulcrum for the other end of the check link, and means adjustably connecting the last mentioned means to said pull rod, said vertical post having an opening adjacent said last mentioned means for affording access to said means.

3. In a scale, the combination of a vertical post, lever means, a pair of balance platforms associated with the lever means, one on each side of the post, pull rods connected to the platforms and extending through the post, the upper end of said post being enlarged to provide a housing, check links in the housing, means providing a fixed pivot member for each check link, an arm on each pull rod extending beyond the vertical walls of the post and into the said housing to which the opposite ends of the check links are fulcrumed, and adjustable means connecting said arms to the pull rods.

4. In a scale, the combination of a vertical post, lever means, a pair of balance platforms associated with the lever means, one on each side of the post, pull rods connected to the platforms and extending through post, the upper end of said post being enlarged to provide a housing, check links in the housing, means providing a fixed pivot member for each check link, an arm on each pull rod extending beyond the vertical walls of the post and into said housing to which the opposite ends of the check links are fulcrumed, and adjustable means connecting said arms to the pull rods, said post having an opening positioned substantially centrally thereof for affording access to said adjustable means.

5. In a scale, the combination of a pair of load supporting platforms mounted on opposite ends of a balance beam, a hollow post positioned between the platforms and rising vertically therefrom, said post being of relatively small horizontal dimensions, a housing at the upper end of the post having an opening in one wall, pull rods connected to the platforms and extending vertically through the post, a pair of check links pivoted in the housing accessible through the opening, an arm connected to the upper end of each pull rod and extending into the housing beyond the vertical walls of the post, and means pivotally connecting the check links and said arms.

6. In a scale, the combination of a pair of load supporting platforms mounted on opposite ends of a balance beam, a hollow post positioned between the platforms and rising vertically therefrom, said post being of relatively small horizontal dimensions, a housing at the upper end of the post, pull rods connected to the platforms and extending vertically through the post, a pair of check links pivoted in the housing, an arm connected to the upper end of each pull rod and extending into the housing beyond the vertical walls of the post, means pivotally connecting the check links and said arms, and adjustable means for connecting said arms to the pull rods.

7. In a scale, the combination of a pair of load supporting platforms mounted on opposite ends of a balance beam, a hollow post positioned between the platforms and rising vertically therefrom, said post being of relatively small horizontal dimensions, a housing at the upper end of the post, pull rods connected to the platforms and extending vertically through the posts, a pair of check links pivoted in the housing, an arm connected to the upper end of each pull rod and extending into the housing beyond the vertical walls of the post, means pivotally connecting the check links and said arms, and adjustable means for connecting said arms to the pull rods, said adjustable means being disposed within an area bounded by the walls of the post, and said post and housing having an opening therein for affording access to said adjustable means.

8. In a scale, the combination of a load receiving beam, a pair of platforms mounted at opposite ends of the beam, means adapted to balance a weight placed upon one platform, indicating mechanism including a chart having indicia for indicating the weight of an article on the one said platform, second indicia on said chart having its zero point substantially central of the chart, and an auxiliary weight adapted to be associated with the platforms to balance the same at the zero point of the second indicia whereby the two platforms of the scale may be used in an even balance manner.

9. In a scale, a chart having two sets of numerals, one set having its zero starting point at one edge of the chart, and the other set having its zero starting point at the center of the chart, a scale mechanism including a pointer for transversing the chart, a pair of platforms, a weight, means for controlling the weight so that the same may be associated and disassociated with the platforms to position the pointer at different zero starting points, whereby the scale may be employed as a computing scale and as an even balance scale as elected.

10. In a scale, the combination of a pair of platforms, a chart having two sets of indicating numerals thereon, a pointer, one set of numerals having its zero starting point at one edge of the chart and the other set of numerals having its zero starting point centrally of the chart, an auxiliary weight, means associated with the weight and operable to move the weight to and from associated position with the scale, whereby in one position of the weight the said pointer assumes the zero position for one set of numerals, and in another position of the weight the said pointer assumes the zero position for the other set of numerals.

11. In a scale, a housing, movable scale mechanism members therein, said housing having an opening, a closure member for the opening, a slidable element carried by the closure member, a weight within the housing, means on the scale mechanism for supporting the weight, said slidable member being movable to support the weight independently of the scale mechanism.

12. In a scale, a housing, movable scale mechanism members therein, said housing having an opening, a closure member for the opening, a slidable element carried by the closure member, a weight within the housing, means on the scale mechanism for supporting the weight, said slidable member being movable to support the weight independently of the scale mechanism, said closure member having an elongated opening therein and an operating device attached to the slidable member and extending through the said elongated opening.

13. In a scale, a housing, movable scale mechanism members therein, said housing having an opening, a closure member for the opening, a slidable element carried by the closure member, a weight within the housing, means on the scale mechanism for supporting the weight, said slidable member being movable to support the weight independently of the mechanism, said closure member having an elongated opening therein, an operating device attached to the slidable member and extending through the said elongated opening, and a spring within the housing having a projecting device, said slidable member having a notch for engagement with the spring whereby to hold the slidable member in weight-supporting position.

14. In a scale, a housing, movable scale mechanism members therein, said housing having an opening, a closure member for the opening, a slidable element carried by the closure member, a weight within the housing, means on the scale mechanism for supporting the weight, said slidable member being movable to support the weight independently of the mechanism, said closure member having an elongated opening therein, an operating device attached to the slidable member and extending through the said elongated opening, a spring within the housing having a projecting device, said slidable member having a notch for engagement with the spring whereby to hold the slidable member in weight-supporting position, and a plunger carried by the closure member and engaging the spring, said plunger being movable to flex the spring for disengagement from holding position as regards the slidable member.

In testimony whereof I affix my signature.

BERT W. KING.